(12) United States Patent
Xu

(10) Patent No.: US 11,554,650 B2
(45) Date of Patent: Jan. 17, 2023

(54) TONNEAU COVER SYSTEMS AND METHODS THEREOF

(71) Applicant: Cixi City Liyuan Auto Parts Co., Ltd, Cixi (CN)

(72) Inventor: Enli Xu, Cixi (CN)

(73) Assignee: Cixi City Liyuan Auto Parts Co., Ltd, Cixi (CN)

(*) Notice: Subject to any disclaimer, the term of this patent is extended or adjusted under 35 U.S.C. 154(b) by 0 days.

(21) Appl. No.: 17/514,900

(22) Filed: Oct. 29, 2021

(65) Prior Publication Data

US 2022/0055463 A1 Feb. 24, 2022

Related U.S. Application Data

(63) Continuation of application No. 17/176,363, filed on Feb. 16, 2021, now Pat. No. 11,180,010.

(30) Foreign Application Priority Data

Aug. 24, 2020 (CN) .......................... 202021779077.0
Aug. 24, 2020 (CN) .......................... 202021779113.3
Aug. 24, 2020 (CN) .......................... 202021780483.9

(51) Int. Cl.
*B60J 7/08* (2006.01)
*B60J 7/10* (2006.01)
*B60J 7/14* (2006.01)
*B60J 7/00* (2006.01)

(52) U.S. Cl.
CPC ............ *B60J 7/106* (2013.01); *B60J 7/0084* (2013.01); *B60J 7/08* (2013.01); *B60J 7/141* (2013.01)

(58) Field of Classification Search
CPC ... B60J 7/0084; B60J 7/02; B60J 7/022; B60J 7/04; B60J 7/08; B60J 7/106
USPC .................. 296/100.02, 4, 6–9, 11–14, 17
See application file for complete search history.

(56) References Cited

U.S. PATENT DOCUMENTS

| 10,746,209 | B2* | 8/2020 | Voegele ................. B60J 7/198 |
| 2014/0312645 | A1* | 10/2014 | Maimin .................. B60J 7/141 296/100.09 |
| 2020/0324633 | A1* | 10/2020 | Shi .......................... B60J 7/198 |

* cited by examiner

*Primary Examiner* — Dennis H Pedder
(74) *Attorney, Agent, or Firm* — Adsero IP

(57) ABSTRACT

Novel techniques are provided for implementing a tonneau cover system. A tonneau cover system might include a first side rail configured to be coupled to a side wall of a bed of a truck, a first connection plate attached to and extending from the first side rail, a second connection plate, an extension plate extending from and attached to the second connection plate, and a cover for covering the bed of the truck and coupled to the extension plate. The first connection plate might include a recess on a bottom surface of the first connection plate. The second connection plate might include a first protrusion mirroring the first recess on the first connection plate. The first protrusion of the second connection plate might removably engage with the recess on the bottom surface of the first connection plate to couple the second connection plate to the first connection plate.

20 Claims, 9 Drawing Sheets

TONNEAU COVER SYSTEMS AND METHODS THEREOF

CROSS-REFERENCE TO RELATED PATENT APPLICATIONS

This application is a continuation to U.S. patent application Ser. No. 17/176,363, filed on Feb. 16, 2021, which claims the benefit of Chinese Patent Application No. CN202021779113.3, filed on Aug. 24, 2020, Chinese Patent Application No. CN202021779083.6, filed on Aug. 24, 2020, Chinese Patent Application No. CN202021779082.1, filed on Aug. 24, 2020, and Chinese Patent Application No. CN202010856513.8, filed on Aug. 24, 2020, the entire contents of which are incorporated herein by reference in their entireties for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatus for implementing a tonneau cover system.

BACKGROUND

Traditionally, truck cover systems are often used to protect cargo beds of pickup trucks. Cover systems often cover all or a portion of the cargo bed of the truck such that any items stored and/or hauled in the cargo bed are protected from outside elements and theft. In order to accommodate the storage and/or hauling of larger objects, as well as to facilitate easy loading and unloading of the cargo bed, many conventional cover systems are foldable into a storage position. This enables the cargo bed to be exposed without removing the cover entirely from the truck. However, when coupling multiple cover panels and/or hinges, seams are often formed such that water and other liquids may easily pass through and reach any cargo within the truck bed.

Hence, there is a need for more robust and scalable solutions for implementing methods, systems, and apparatus for implementing a tonneau cover system.

SUMMARY

Various embodiments provide tools and techniques for implementing a tonneau cover system. For example, a tonneau cover system may be implemented. The tonneau cover system might include a first side rail configured to be coupled to a side wall of a bed of a truck, a first connection plate attached to and extending from the first side rail, a second connection plate, an extension plate extending from and attached to the second connection plate, and a cover for covering the bed of the truck and coupled to the extension plate. The first connection plate might include a first recess on a bottom surface of the first connection plate. The second connection plate might include a first protrusion mirroring the first recess on the first connection plate. The first protrusion of the second connection plate might removably engage with the first recess on the bottom surface of the first connection plate to couple the second connection plate to the first connection plate. When the cover is closed, the extension plate may bear a weight of the cover and distribute a force of the cover through the second connection plate, pulling the first connection plate downward, and securing the first side rail against the side wall of the bed of the truck.

Several advantages may be realized from this design of the tonneau cover system. For example, embodiments provide a tonneau cover system that can improve the releasable engagement between the first connection plate and the second connection plate which allows the tonneau cover system to fit within truck beds of different sizes and/or shapes. In addition, embodiments provide a tonneau cover system having multiple foldable panels which allows the tonneau cover to be partially open for easy access to the inside of the truck bed. By having one or more hinged connections between the foldable panels, a seamless connection between the panels can be formed to prevent precipitation and dirt from entering the truck bed. Further, a drainage structure along with a drainage channel formed by different surfaces of the first and/or second side rails facilitate the flow of liquid and, thus, prevent water and/or other liquid from entering the truck bed and damaging cargo contained within the truck bed. These and other advantages and features are described in more detail in conjunction with the text below and attached figures.

In an aspect, a tonneau cover system might include a first side rail configured to be coupled to a side wall of a bed of a truck, a first connection plate attached to and extending from the first side rail, a second connection plate, an extension plate extending from and attached to the second connection plate, and a cover for covering the bed of the truck and coupled to the extension plate. The first connection plate might include a first recess on a bottom surface of the first connection plate. The second connection plate might include a first protrusion mirroring the first recess on the first connection plate. The first protrusion of the second connection plate might removably engage with the first recess on the bottom surface of the first connection plate to couple the second connection plate to the first connection plate. When the cover is closed, the extension plate may bear a weight of the cover and distribute a force of the cover through the second connection plate, pulling the first connection plate downward, and securing the first side rail against the side wall of the bed of the truck.

In some embodiments, the extension plate may extend partway along the first side rail and is located toward a front of the truck.

In some embodiments, the first protrusion slidingly engages with the first recess. In some cases, the first recess and the first protrusion may be T-shaped.

In some cases, the cover may further include a connector coupling the cover to the first connection plate and the second connection plate. The connector may be made out of rubber.

In various instances, the connector may further include a gap located above the first connection plate and below the cover. The gap may cause the extension plate and the second connection plate to bear the weight of the cover.

In various embodiments, the second connection plate may further include a second connection plate interior surface in parallel with a side wall of the bed of the truck. The second connection plate interior surface comprises one or more third grooves.

In some instances, the tonneau cover system may further include a clamp clamping the second connection plate interior surface and a side wall interior surface of the bed of the truck. At least one end of the clamp may comprise one or more first grooves. The one or more first grooves may align with the one or more third grooves to hold the second connection plate and first side rail against the side wall of the bed of the truck.

In some embodiments, the tonneau cover system may further include a drainage structure. The drainage structure might include a second side rail, and a third connection plate attached to the second side rail. The third connection plate may comprise a drainage pipe extending through the third connection plate. A top of the drainage pipe may be level with a top surface of the third connection plate.

In some cases, the third connection plate may releasably engage with the second connection plate. According to some embodiments, the third connection plate might slidingly engage with the second connection plate.

In some embodiments, liquid may flow over the top surface of the first connection plate and may drain out of the drainage pipe.

In various embodiments, the tonneau cover might further comprise a mounting feature configured to secure the cover to the first side rail.

In some instances, the cover might comprise two or more foldable panels. At least one foldable panel of the two or more foldable panels is coupled to an other of the foldable panels via a hinged connection. In some cases, the hinged connection may be made of rubber.

In some embodiments, at least one foldable panel and the other of the foldable panels are slidably coupled to the hinged connection.

In some cases, the at least one foldable panel and the other of the foldable panels may comprise one or more second slots. The hinged connection may comprise one or more second protrusions mirroring the one or more second slots. The one or more second protrusions may engage with the one or more second slots to couple the hinged connection to the at least one foldable panel and the other of the foldable panels.

According to some embodiments, the one or more second slots may comprise at least three second recesses. The one or more second protrusions may comprise at least three prongs. The at least three prongs may engage with the at least three second recesses to couple the hinged connection to the at least one foldable panel and the other of the foldable panels. In some cases, a center of the hinged connection may be open.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
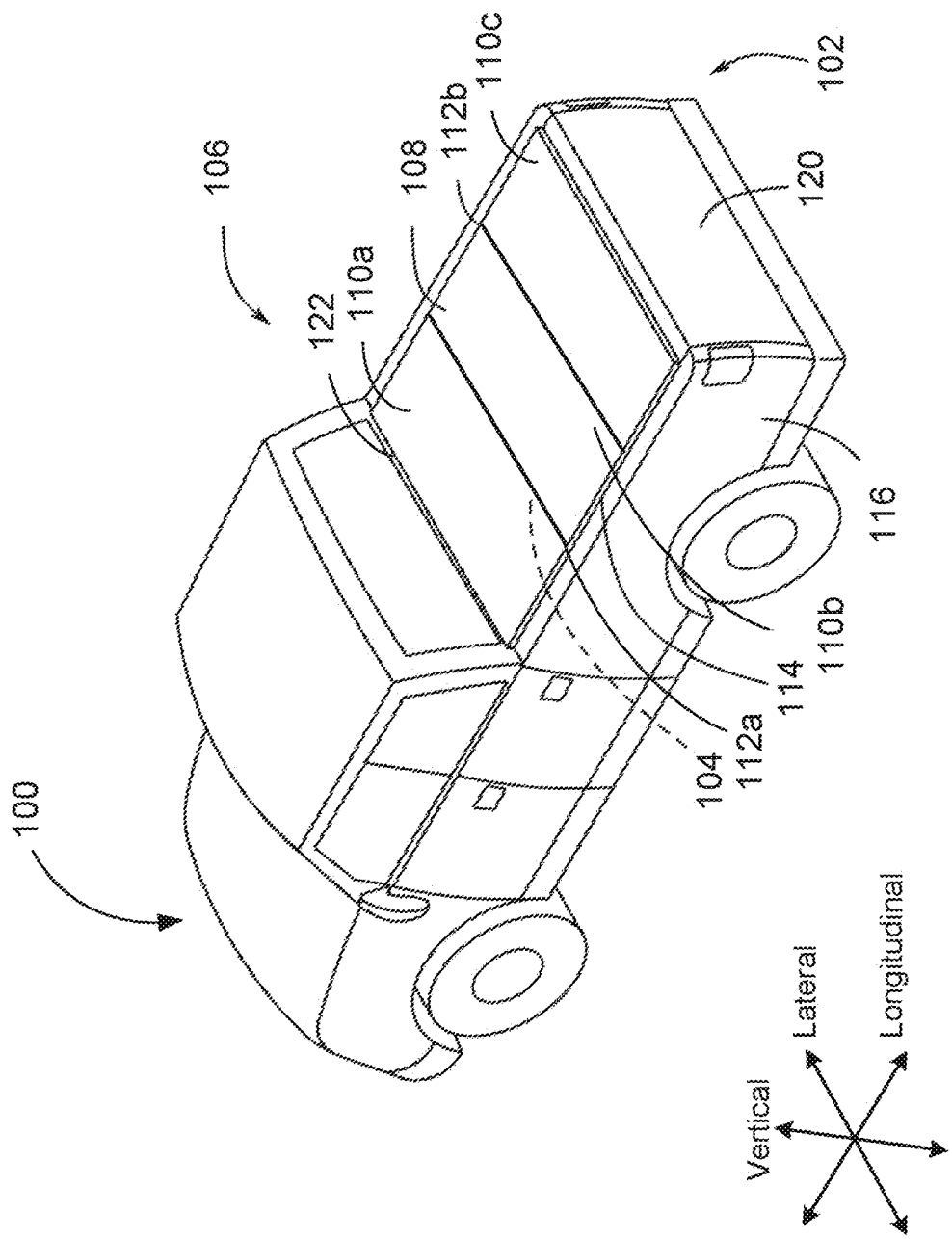
FIG. 1 is a perspective view of an embodiment of a truck with a tonneau cover system, in accordance with various embodiments.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Various uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above-described features.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

We now turn to the embodiments as illustrated by the drawings. FIGS. 1-4 illustrate some of the features of the method, system, and apparatus for implementing a tonneau cover system. The methods, systems, and apparatuses illustrated by FIGS. 1-4 refer to examples of different embodiments that include various components and steps, which can be considered as alternatives or which can be used in conjunction with one another in the various embodiments. The description of the illustrated methods, systems, and apparatuses shown in FIGS. 1-4 is provided for purposes of illustration and should not be considered to limit the scope of the different embodiments. Further, the various components of the figures are merely illustrative and are not intended to be to scale.

With reference to the figures, FIG. 1 is a perspective view of an embodiment of a truck 100 with a truck tonneau cover system 102, in accordance with various embodiments. As illustrated, the tonneau cover system 102 covers the compartment 104 formed by a truck bed 106 to protect an interior of the truck bed 106 and items that may be stored in the compartment 104. For example, the tonneau cover system 102 may block dirt and precipitation from entering the truck bed 106. The truck bed 106 includes a front wall 122, one or more side walls 116, and a tailgate 120. It should be understood by a person having ordinary skill in the art that one or more side walls 116 may be identical, yet arranged in mirrored symmetry. Therefore, in the interest of brevity, only one side wall 116 will be discussed in detail below in connection with the tonneau cover system 102 unless noted otherwise.

The tonneau cover system 102 includes a cover 108 that extends over the compartment 104. The cover 108 may be flexible. The cover 108 may include one or more panels 110a, 110b, and/or 110c. Although three panels 110a, 110b, and/or 110c are shown in FIG. 1, the cover 108 may include more than or less than three panels. The cover 108 may be configured to flex or bend at the borders 112a and/or 112b of the panels 110a, 110b, and 110c. For example, the borders 112a and/or 112b may comprise one or more hinged connections (not shown in FIG. 1) configured to connect one or more panels 110a, 110b, and/or 110c together. Additionally and/or alternatively, the cover 108 may be configured to bend or flex at locations other than the borders 112a and/or 112b. The cover 108 may be made out of a variety of materials including fabric, plastic (e.g., vinyl), rubber, etc.

The cover 108 couples to the truck bed 106 with first side rails 114 that in turn couple to truck side walls 116 (e.g., truck bed walls). The first side rails 114 may be coupled to a corresponding truck side wall 116 in various ways including clamping, riveting, welding, bolting, and the like. A front portion of the cover 108 may be fixedly coupled to the sidewall 116 through one or more mounting structures (not shown in FIG. 1). For example, the tonneau cover system 102 may include two mounting structures one at each corner of the truck bed 106 next to the front wall 122. The tonneau cover system 102 may further include one or more drainage structures (not shown in FIG. 1) located toward the front wall 122 of the truck bed 106 and disposed at a front end of the first side rail 114. The drainage structures may be configured to facilitate the flow of precipitation off of the tonneau cover system 102 so as to prevent water and/other liquid from entering the truck bed 106.

Figure 2A:
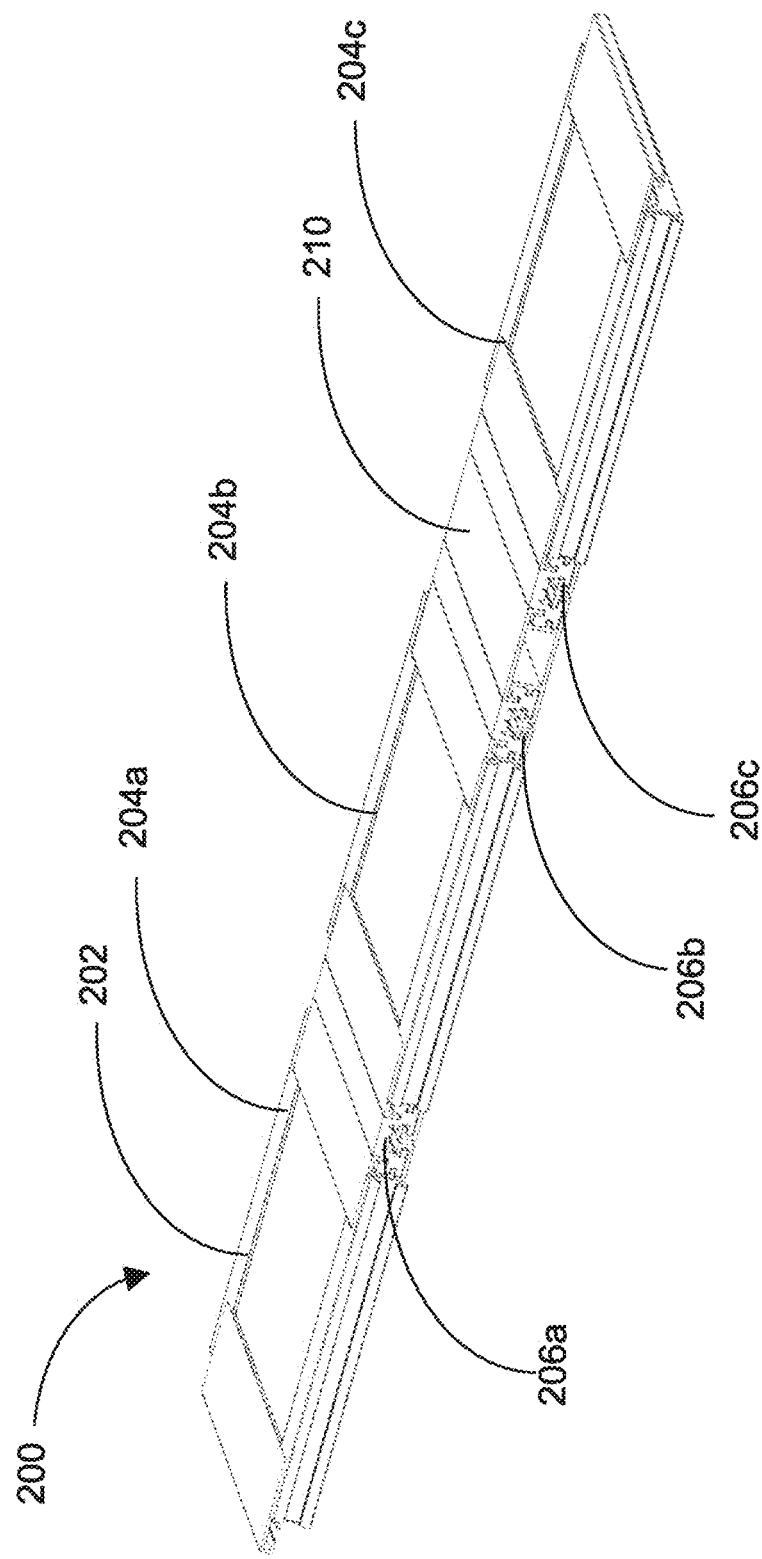
FIG. 2A is a perspective view of a tonneau cover system with one or more hinged connections, in accordance with various embodiments.
Figure 2B:
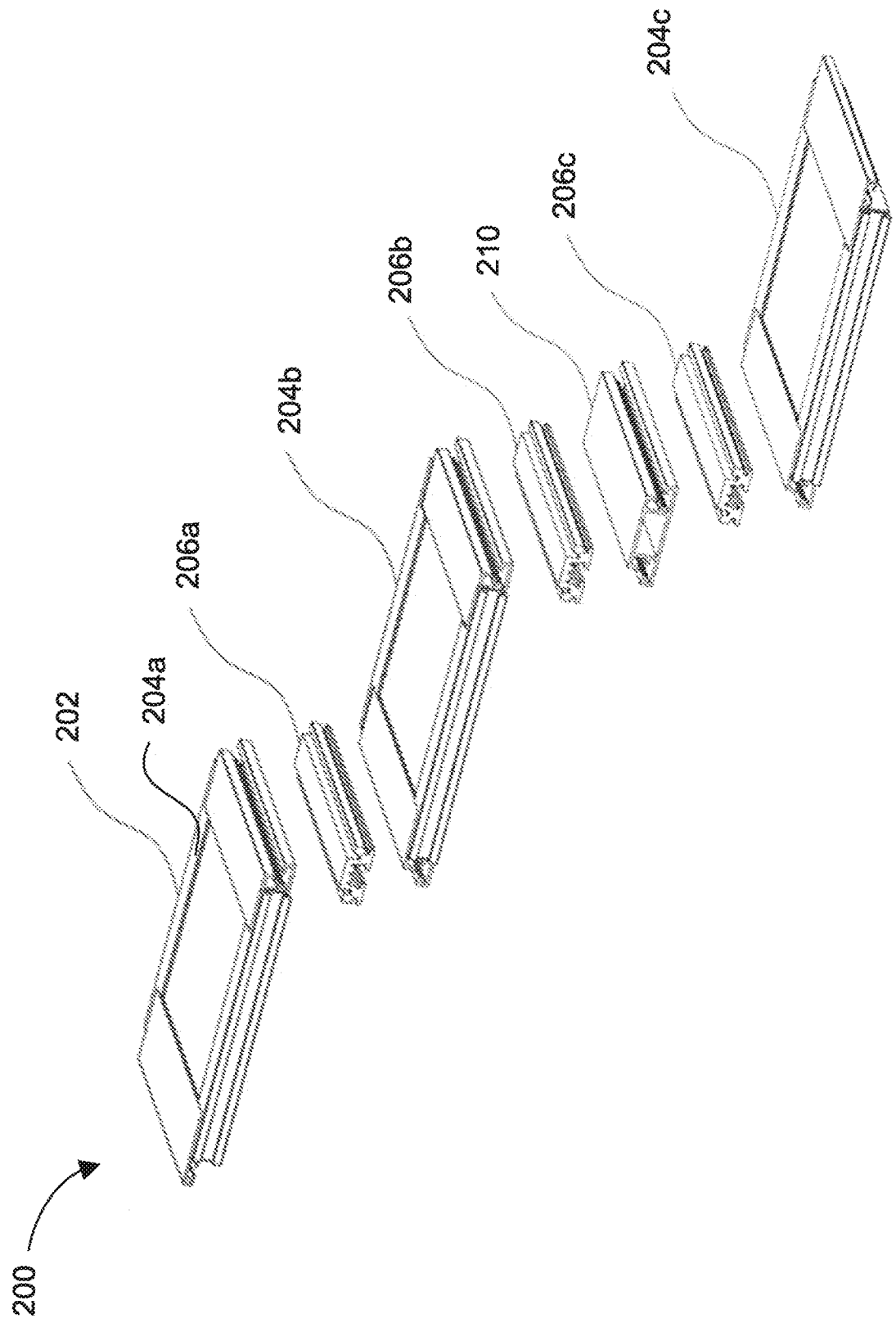
FIG. 2B is an exploded view of a tonneau cover system with one or more hinged connections from FIG. 2A, in accordance with various embodiments.

FIG. 2A is a perspective view of a tonneau cover system 200, in accordance with various embodiments. FIG. 2B is an exploded view of a tonneau cover system 200 with one or more hinged connections from FIG. 2A, in accordance with various embodiments. The tonneau cover system 200 may be similar to the tonneau cover system 102 shown in FIG. 1.

The tonneau cover system 200 may comprise a cover 202 including one or more panels 204a, 204b, and/or 204c (collectively, panels 204). The one or more panels 204 may be formed from a flexible material. The flexible material may include fabric, plastic (e.g., vinyl), rubber, etc. The panels 204 may have various shapes so as to fit within different truck beds, for example, rectangular, square, and/or the like. The panels 204 may also be solid and/or hollow plates or may be composite structures. For example, the panels 204 may comprise one or more layers adhesively coupled together, which can reduce total weight while maintaining the rigidity of the cover 202. Although three panels 204 are shown in FIG. 2, the cover 200 may include more than or less than three panels.

The one or more panels 204 may be connected to each other via one or more hinged connections 206a, 206b, and/or 206c (collectively, hinged connections 206). The hinged connections 206 may be formed from a flexible material. The flexible material may include fabric, plastic (e.g., vinyl), rubber, etc. The cover 202 may be configured to bend at the one or more hinged connections 206. In a non-limiting example, a user may bend the cover 202 and the one or more hinged connections 206 to access the bed of the truck. The hinged connections 206 may also be configured to form a seamless connection between the panels 204 so as to prevent precipitation and/or dirt from entering the truck bed. The tonneau cover system 200 may further comprise one or more connection panels 210 coupled to the hinged connections 206 to allow two or more panels 206 to be folded onto one another.

Figure 3A:
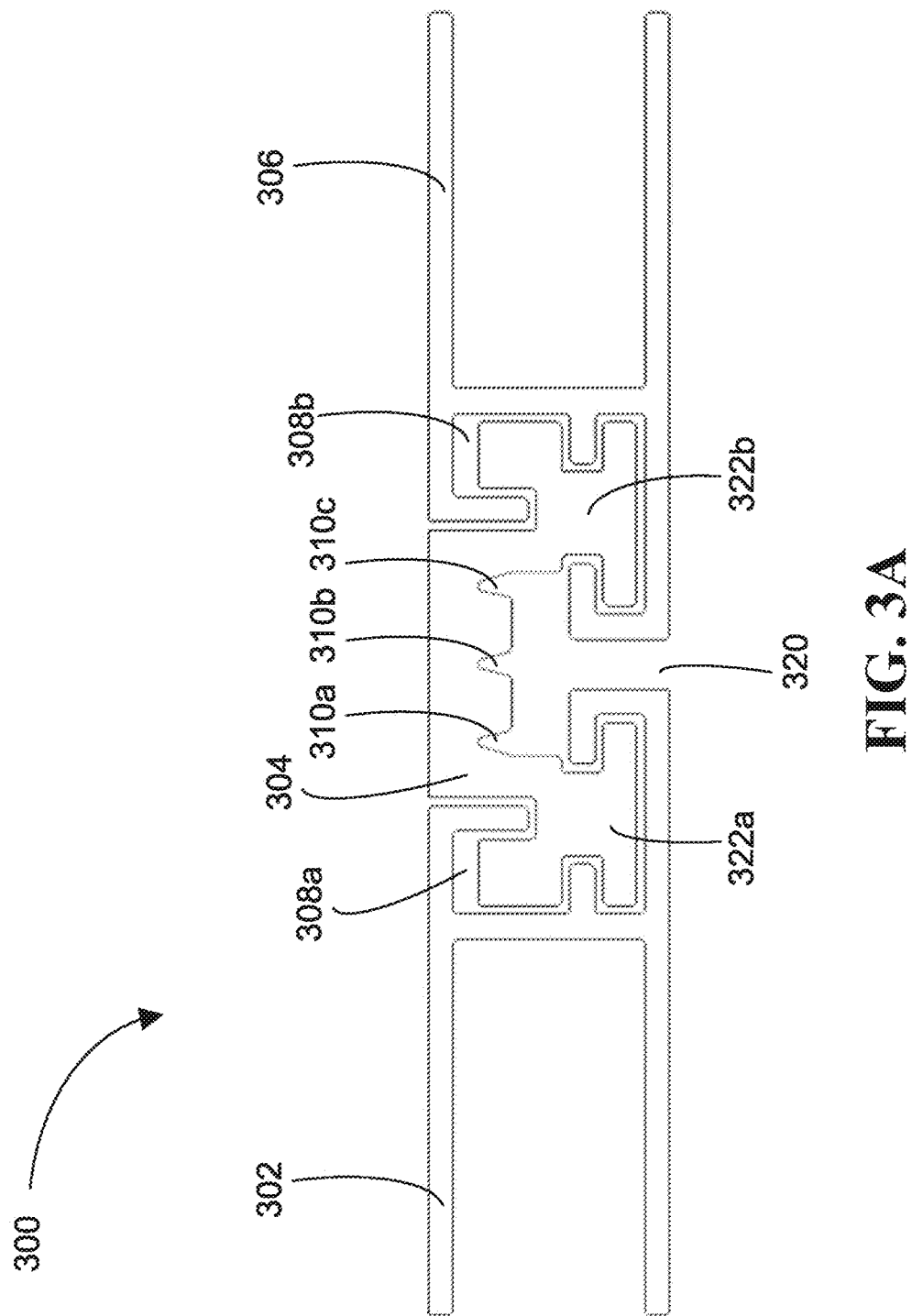
FIG. 3A is a partial front view of a hinged connection from FIGS. 2A and 2B, in accordance with various embodiments.
Figure 3B:
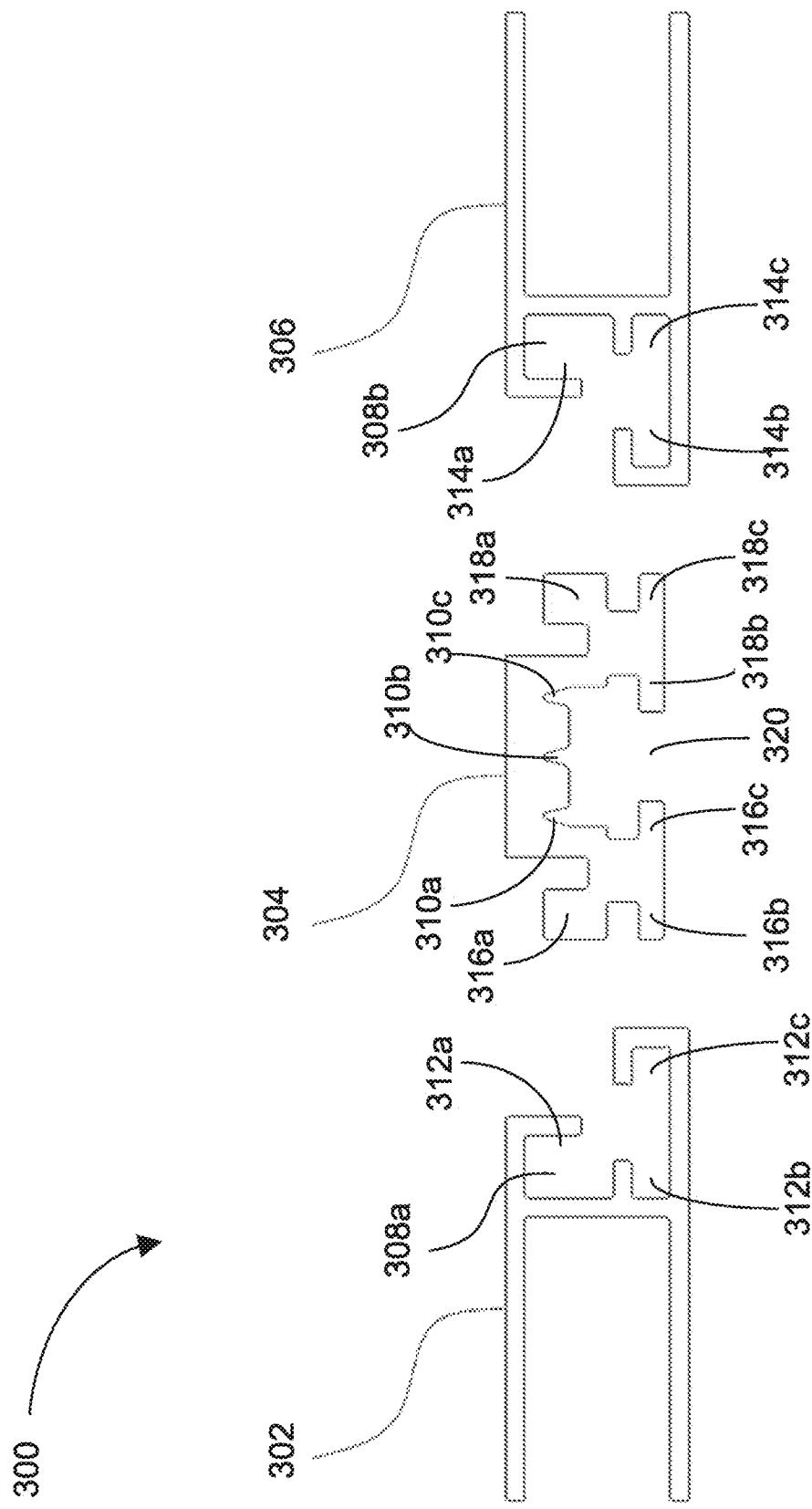
FIG. 3B is an exploded view of a hinged connection from FIGS. 2A and 2B, in accordance with various embodiments.

FIG. 3A is a partial front view of a hinged connection system 300 from FIGS. 2A and 2B, in accordance with various embodiments. FIG. 3B is an exploded view of the hinged connection system 300 from FIGS. 2A and 2B, in accordance with various embodiments. The hinged connection system 300 may include a hinged connection 304 that is similar to the hinged connections 206 of FIGS. 2A and/or 2B.

The hinged connection 304 may be configured to couple a first panel 302 and a second panel 306 together as well as to allow the tonneau cover to be bent at the hinged connection 304 when the cover is in a folded position. Additionally and/or alternatively, the hinged connection 304 may be configured to couple a first panel 302 to a connection panel (shown in FIG. 2) and/or the hinged connection may be configured to couple two connection panels together (not shown). The hinged connections 304 may be formed from a flexible material. The flexible material may include fabric, plastic (e.g., vinyl), rubber, etc. The hinged connection 304 may be coupled to one or more panels 302 and 306 in various ways. For example, the hinged connection 304 may slidably engage with and/or removably couple to the one or more panels 302 and 306.

In some embodiments, the first panel 302 may comprise one or more first slots 308a. The second panel 306 may comprise one or more second slots 308b. The hinged connection 304 may include a first protrusion 322a and a second protrusion 322b. The first protrusion 322a of the hinged connection 304 may mirror the first slot 308a of the first panel 302. The second protrusion 322b of the hinged connection 304 may mirror the second slot 308b of the second panel 306. Therefore, the hinged connection 304 can be removably attached to the one or more panels 302 and 306 through the engagement between each protrusion of the one or more protrusions 322a, 322b with a corresponding slot of one or more slots 308a, 308b. For example, the first protrusion 322a may snap into and/or out of the first slot 308a and the second protrusion 322b may snap into and/or out of the second slot 308b.

The protrusions 322a, 322b may mirror the slots 308a, 308b in various ways. In some embodiments, the first slot 308a may include one or more first recesses 312a, 312b, and/or 312c (collectively, first recesses 312). The second slot 308b may include one or more second recesses 314a, 314b, and/or 314c (collectively, second recesses 314). The first protrusion 322a may include one or more first prongs 316a, 316b, and/or 316c (collectively, first prongs 316). The second protrusion 322b may include one or more second prongs 318a, 318b, and/or 318c (collectively, second prongs 318). The first recesses 312 of the first slot 308a may engage and/or interlock with the first prongs 316 of the first protrusion 322a, and the second recesses 314 of the second slot 308b may engage and/or interlock with the second prongs 318 of the second protrusion 322b such that the hinged connection 304 can be removably coupled to the first panel 302, and/or the second panel 306. The hinged connection 304 may further include one or more third recesses 310a, 310b, and/or 310c. When the panels 302, 306 are in folded position, the tonneau cover may be bent at one of the third recesses, for example, 310b.

In some cases, there may be a blank space and/or opening 320 between the first protrusion 322a and the second protrusion 322b of the hinged connection 304. In other words, the center of the hinged connection 304 is open. When the first panel 302 and the second panel 306 are coupled together through the hinged connection 304, the blank space and/or opening 320 allows the panels 302, 306 to be folded and/or unfolded around the hinged connection 304 at the one or more third recesses 310.

Figure 4A:
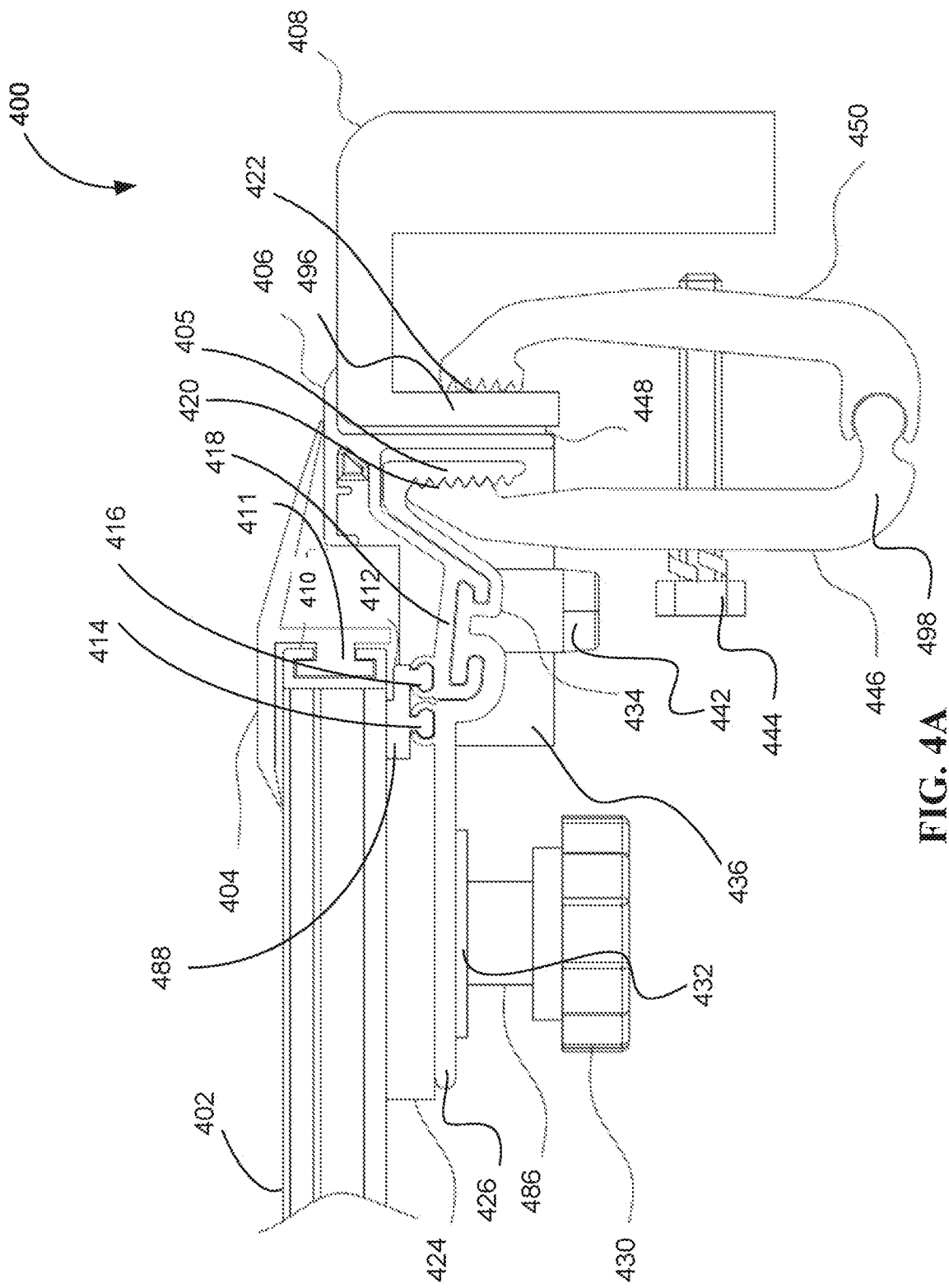
FIG. 4A is a partial front view of a tonneau cover system, in accordance with various embodiments.
Figure 4B:
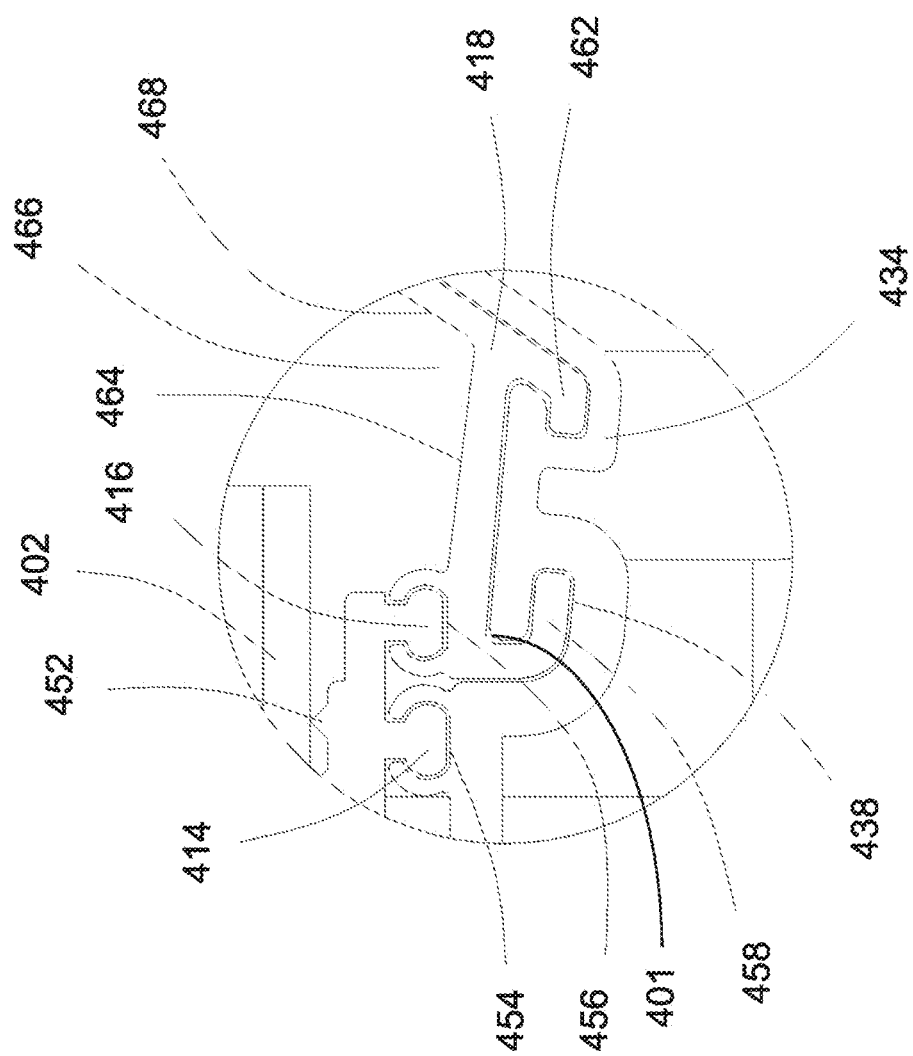
FIG. 4B is a partial enlarged view of the tonneau cover system from FIG. 4A, in accordance with various embodiments.
Figure 4C:
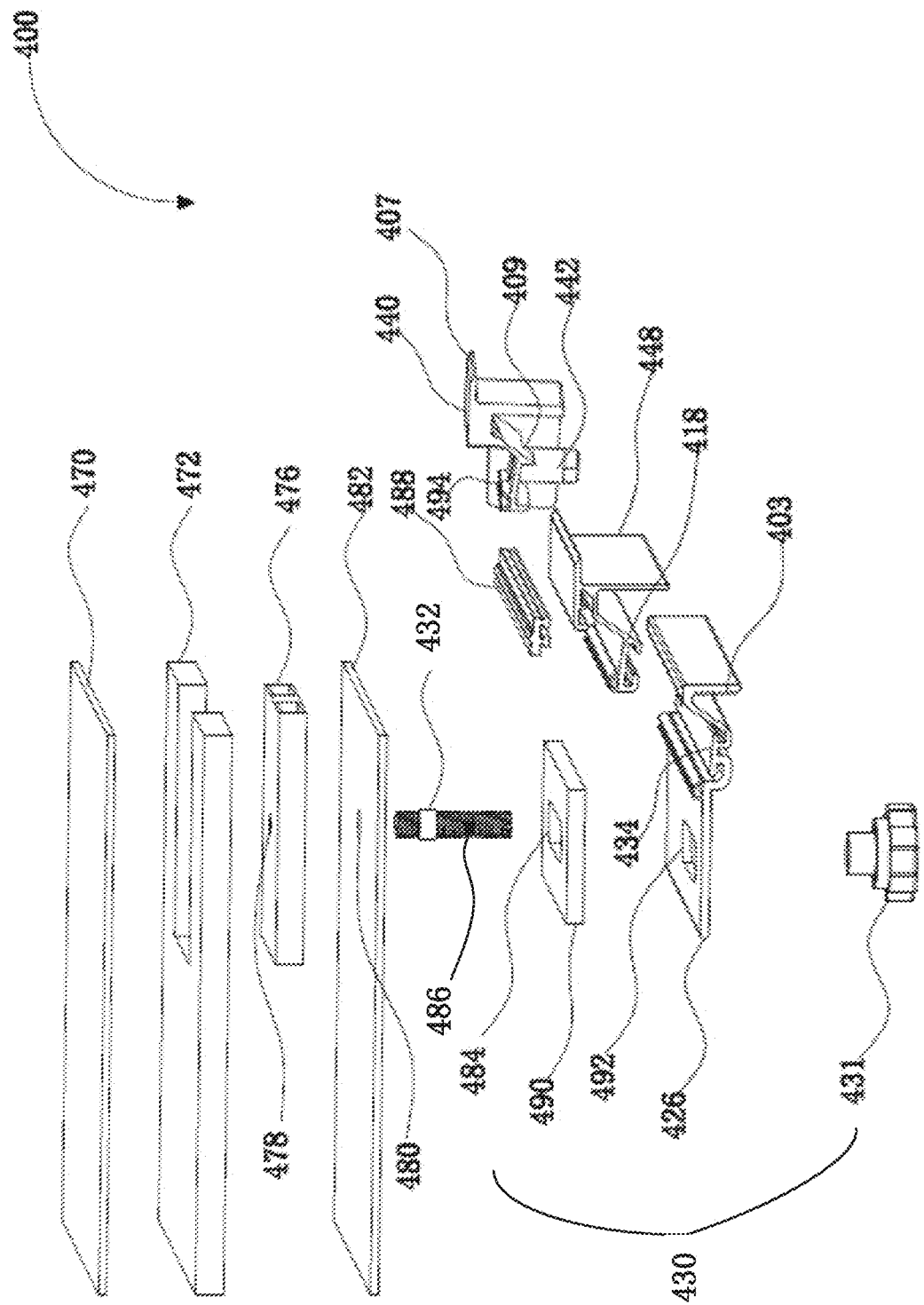
FIG. 4C is an exploded view of a tonneau cover system from FIG. 4A, in accordance with various embodiments.
Figure 4D:
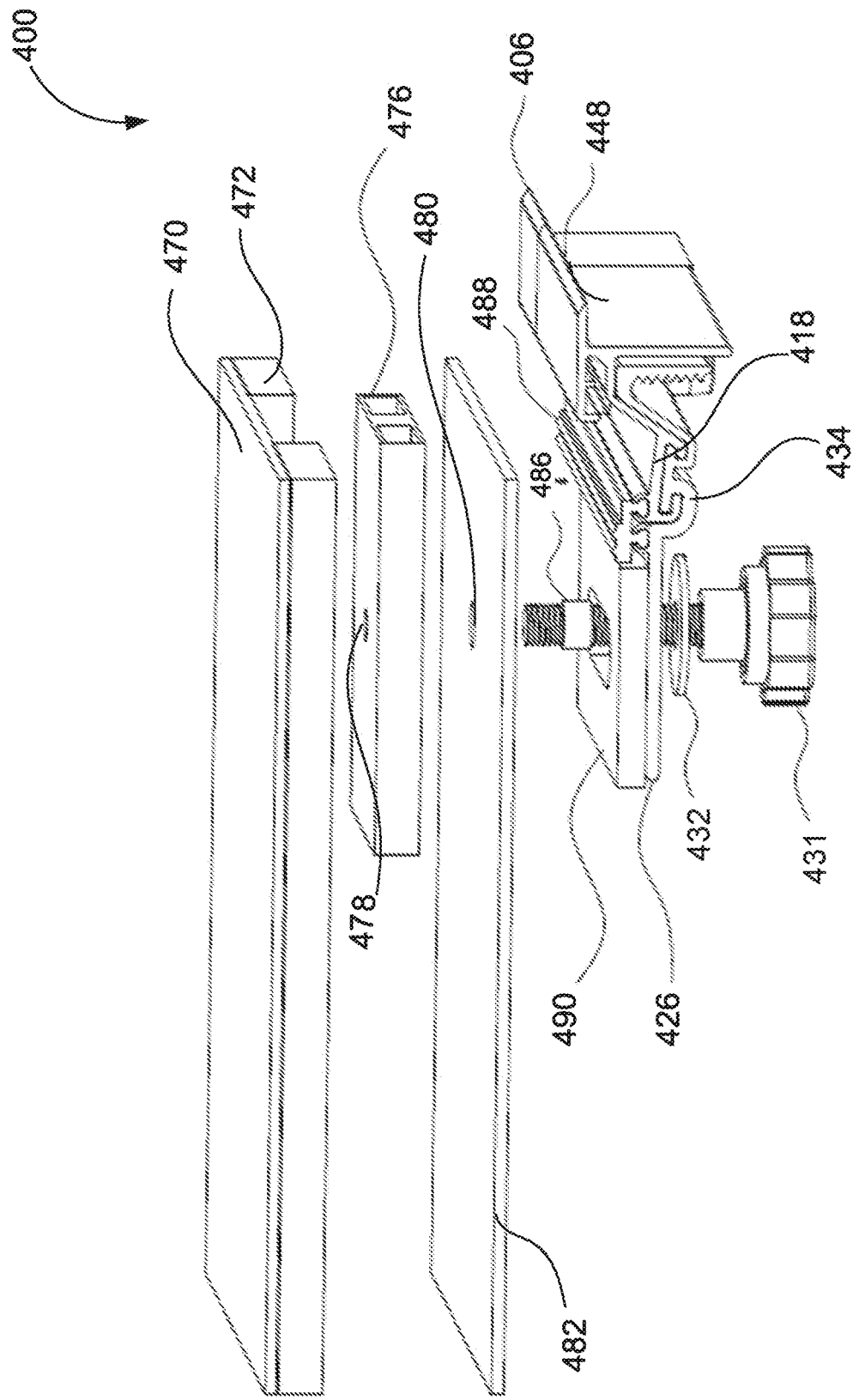
FIG. 4D is an exploded view of a tonneau cover system from FIG. 4A, in accordance with various embodiments.

FIG. 4A is a partial front view of a tonneau cover system 400, in accordance with various embodiments. FIG. 4B is a partial enlarged view of the tonneau cover system 400 from FIG. 4A, in accordance with various embodiments. FIG. 4C is an exploded view of a tonneau cover system 400, in accordance with various embodiments. FIG. 4D is an exploded view of a tonneau cover system 400, in accordance with various embodiments. The tonneau cover system 400 may be similar to the tonneau cover system 102 shown in FIG. 1 and/or the tonneau cover system 200 shown in FIG. 2.

The tonneau cover system 400 might include a cover 402, a first side rail 406 having a first connection plate 418 extending from the first side rail 406, a second connection plate 434, and an extension plate 426 extending from and attached to the second connection plate 434. The cover 402 might cover a bed of the truck and protect the bed of the truck. The cover 402 might include a connector 488 removably attached to the cover 402. The connector 488 might include a first prong 416, a second prong 414, and a gap 412 extending over first prong 416. The first side rail 406 might be coupled to a side wall 496 of the truck bed 408. In some embodiments, the tonneau cover system 400 may further include a sealing strip 404 removably attached to the cover 402. The sealing strip 404 may be configured to seal down onto the top of the first side rail 406 when the cover 402 is closed so as to block the precipitation and/or dirt from entering the truck bed 408. The sealing strip 404 may include an attachment feature 411 configured to removably engage with and/or interlock with a slot feature 410 of the cover 402. For example, the attachment feature 411 as shown may be T-shaped, but it is understood that other shapes can be used as well. In various implementations, the attachment feature 411 can be configured in a wishbone or other shapes. The sealing strip 404 might be formed from a flexible material that has the ability to bend with the cover 402. The flexible material might include fabric, plastic (e.g., vinyl), rubber, etc.

The first connection plate 418 of the first side rail 406 might include a first recess 401 and a second recess 456. The first recess 401 may be located on a bottom surface of the first connection plate 418 and the second recess 456 may be located on a top surface of the first connection plate 418. The first recess 401 might be formed by a third prong 458 and a fourth prong 462. The second connection plate 434 might include a first protrusion 438 and a third recess 454. The first protrusion 438 of the second connection plate 434 might mirror the first recess 401 of the first connection plate 418 such that the first protrusion 438 of the second connection plate 434 may removably and/or slidingly engage with the first recess 401 of the first connection plate 418. Therefore, the first connection plate 418 may removably and/or slidably engage with the second connection plate 434.

In operation, the second connection plate 434 might slidingly engage with and releasably attach to the first connection plate 418. In order to facilitate this connection, the first protrusion 438 of the second connection plate 434 might slidingly engage with and releasably attach to the first recess 401 of the first connection plate 418. In some cases, the first protrusion 438 and the first recess 401 might be T-shaped, but it is understood that other shapes can be used as well.

The first side rail 406 can be configured to fit with and/or attach to side walls of most truck beds since the shapes and structures of most side walls of truck beds are similar, and only the size and/or shape of truck beds may vary. By having the second connection plate 434 configured to removably engage with the first connection plate 418, the tonneau cover system 400 can be easily modified and adapted to fit within truck beds with different shapes and/or sizes.

Additionally, the connector 488 might releasably and/or removably attach the cover 402 to both the first connection plate 418 of the first side rail 406 and the second connection plate 434. When the cover 402 is closed, the first prong 416 might releasably engage with and/or snap into the second recess 456 of the first connection plate 418, the second prong 414 might releasably engage with and/or snap into the third recess 454 of the second connection plate 434, and a top surface of the connector 488 might deform against the cover 402. When the cover 402 is opened, the first prong 416 might snap out of the second recess 456 of the first connection plate 418 and the second prong 414 might snap out of the third recess 454 of the second connection plate 434.

In some embodiments, when the cover 402 is opened, the first prong 416 might stay engaged with the second recess 456 of the first connection plate 418, and the second prong 414 might stay engaged with the third recess 454 of the second connection plate 434. In these embodiments, a top surface of the connector 488 might releasably engage with and/or snap out of the cover 402. Alternatively, in these embodiments, a bottom surface of the cover 402 might rest on top of the top surface (for example, on top of positioning tips 452) of the connector 488 without attaching to the connector 448.

In some cases, the connector 488 might extend along the total length of the cover 402. The connector 488 might be formed from a flexible material that has the ability to bend with the cover 402. The flexible material might include fabric, plastic (e.g., vinyl), rubber, etc. The connector 488 might be configured to block precipitation from entering the truck bed and reduce the wear-and-tear of the truck cover 402. According to some embodiments, the connector 488 may further include one or more positioning tips 452 located on a top surface of the connector 488. When the cover 402 is closed, the one or more positioning tips 452 may deform against the cover 402. Therefore, the contact between the cover 402 and the connector 488 may be minimized so as to facilitate the positioning of the cover 402. Additionally, because the one or more positioning tips 452 may deform against the cover 402, this may further prevent precipitation from entering the truck bed and reduce the wear-and-tear of the truck cover 402.

According to some embodiments, the second connection plate 434 may further include an extension plate 426 extending from and attached to the second connection plate 434. The extension plate 426 may extend partway along the first side rail 406 and is located adjacent to the front wall 436 of the truck bed 408. In some embodiments, the gap 412 may be located above the first connection plate 418 and below the cover 434. The gap 412 may extend over first prong 416 and the first connection plate 418 and cause the weight of the cover 402 to be held by the extension plate 426 and the second connection plate 434. In other words, the force from the cover 402 pushes the extension plate 426 and the second connection plate 434 downward. This in turn, causes the first connection plate 418 and the first side rail 406 to be pulled downward by the extension plate 426 and the second connection plate 434. Advantageously, by distributing the force from the cover 402 to the first side rail 406 in this manner, the first side rail 406 is more securely held in place against the side wall 496 of the truck bed 408. Thus, a clamp 498 does not need to exert much force to couple the second connection plate 434 and the side wall 496 of the truck bed 408 together. The clamp 498 merely acts as a backup to clamp the second connection plate 434 and the side wall 496 of the truck bed 408 together.

According to some embodiments, the tonneau cover system 400 might further include the clamp 498 configured to clamp the second connection plate 434 and the side wall 496 of the truck bed 408 together. The clamp 498 may include a first clamp frame 446 and a second clamp frame 450 that couple together using a fastener 444. The fastener 444 might be a bolt, a screw, and/or the like. The clamp frames 446, 450 might be C-shaped, but it is understood that other shapes can be used as well. The first clamp frame 446 might include one or more first grooves 420. The second clamp frame 450 might include one or more second grooves 422. In some embodiments, the second connection plate 434 might further include one or more third grooves 403 that align with the first grooves 420 of the clamp 498. The third grooves 403 of the second connection plate 434 might removably engage with the first grooves 420 of the clamp 498. The third grooves 403 may be located on a first interior surface 405 of the second connection plate 434. The first interior surface 405 of the second connection plate 434 may be in parallel with a second interior surface 448 of the first side rail 406, as well as the side wall 496 of the truck bed 408. According to some embodiments, the first grooves 420 of the first clamp frame 446 and the second grooves 422 of the second clamp frame 450 may be of different/same sizes in order to facilitate orientation and coupling of the clamp frames 446, 450 during installation. In a non-limiting example, the first grooves 420 and third grooves 403 may be a first size to facilitate orientation and coupling between the second connection plate 434 and the first clamp frame 446 and the second grooves 422 may be a second different size to facilitate orientation and coupling between the second clamp frame 450 and the side wall 496 of the truck bed 408.

In operation, the first clamp frame 446 might removably attach to a portion of the second connection plate 434, such as the first interior surface 405 of the second connection plate 434. The first grooves 420 of the first clamp frame 446 might removably engage with the third grooves 403 of the second connection plate 434. The second clamp frame 450 might removably attach to the side wall 496 of the truck bed 408. A user might compress the first clamp frame 446 and the second clamp frame 450 through fastening the fastener 444. In this way, the second connection plate 434, the first side rail 406, and the side wall 496 of the truck bed 408 can be compressively coupled together.

In some embodiments, the tonneau cover system 400 may further include a drainage structure 440. The drainage structure 440 may be located towards a front end of the truck bed 408. The drainage structure 440 may include a second side rail 407, a third connection plate 409 attached to and extending from the second side rail 407, a drainage hole 494 located on the third connection plate 409, and a drainage pipe 442 extending through the drainage hole 494. A top surface 464 of the first connection plate 418 may be provided as a ramp surface extending upwardly at an angle from the first side rail 406 toward the cover 402. Additionally, in some embodiments, the top surface 464 of the first connection plate 418 may also be sloped toward the drainage hole 494. Further, a side surface 468 of the first side rail 406 may be sloped. The top surface 464 of the first connection plate 408 and the side surface 468 of the first side rail 406 may form a drainage channel 466 configured to allow water and/or other liquid to flow from the cover 402 to the drainage hole 494. A top of the drainage pipe 442 may be level with the top surface of the third connection plate 409 to facilitate drainage. Water and/or other liquid can flow over the top surface 464 of the first connection plate 408 and drain out of the drainage pipe 442. In some embodiments, the first side rail 406 and the second side rail 407 may be provided as one-piece extending along the side wall 496 of the truck bed. Alternatively, the first side rail 406 and the second side rail 407 may be provided as two separate pieces. The third connection plate 409 may have the same structure as the first connection plate 418 such that the third connection plate can removably and/or releasably engage with the second connection plate 434. In some embodiments, the drainage pipe 442 may be fixed onto the third connection plate 409. A front end of the second connection plate 434 may include an opening configured to accommodate the drainage pipe 442 (not shown) in an attached configuration. The drainage pipe 442 may be disengageably coupled to the corresponding opening of the second connection plate 434. In some embodiments, the drainage pipe 442 may fit into the corresponding opening of the second connection plate 434. For example, the opening of the second connection plate 434 may comprise metal alloy material (e.g., aluminum alloy) and may be specifically configured and sized to engage with the drainage pipe 442. According to some embodiments, the drainage pipe 442 may extend through the opening of the first connection plate 418 such that the third connection plate 409 may removably engage with the front end of the first connection plate 418. Such securing mechanism may help with the alignment of the first side rail 406 and the second side rail 407.

In order for the first side rail 406 to be fixedly secured to the cover 402, the tonneau cover system 400 may further include a mounting feature or mounting element 430. In some embodiments, the mounting feature 430 may be located towards a front of the truck. The mounting feature 430 may include a bolt head 431, a foam washer 432, and a bolt body 486. The foam washer 432 may be configured to provide shock and impact absorption. In some embodiments, the cover 402 may include one or more layers. For example, each panel of the cover 402 may include a first layer 470, a second layer 472, a third layer 476, and a fourth layer 482. As shown in FIGS. 4C and 4D, the one or more layers may have different sizes and/or shapes and may couple to and/or fit within one another to enhance the rigidity of the cover 402. One or more layers may be made out of a variety of materials including plastic (e.g., vinyl), metal alloys (e.g., aluminum, steel, and/or titanium) in order to add ruggedness and enhance the safety of the tonneau cover system 400. In some embodiments, one or more layers may be provided as honeycomb panels so as to reduce the total weight of the cover 402 while maintaining the rigidity of the cover 402. In some cases, the one or more layers may have hollow structure in order to limit the total weight of the cover 402 while maintaining the rigidity of the cover 402. In a non-limiting example, second layer 472 and third layer 476 may be disposed between first layer 470 and fourth layer 482 and second layer 472 and third layer 476 may enhance the rigidity of the cover 402. In some embodiments, the second layer may include an opening to allow the third layer 476 to fit within the second layer 472.

According to some embodiments, the tonneau cover system 400 may further include a foam spacer 490 disposed between the cover 402 and the extension plate 426. One or more notches may be drilled through the extension plate 426, the foam spacer 490, and one or more layers of the cover 402 such that the cover 402 can be secured to the first side rail 406 using the mounting feature 430. The foam spacer 490 may be configured to provide shock and impact absorption. For example, the third layer 476 of the cover 402 may include a first notch 478, the fourth layer 482 of the cover 402 may include a second notch 480, the foam spacer 490 may include a third notch 484, the extension plate 426 may include a fourth notch 492. The one or more notches (e.g., notches 478, 480, 484, and/or 492) may include a threaded connection for easy mounting.

In operation, the bolt body 486 may be inserted through the first notch 478 of the third layer 476, the second notch 480 of the fourth layer 482, the third notch 484 of the foam spacer 490, and the fourth notch of the extension plate 426. The notches may be configured to accommodate the bolt body 486. In some cases, the bolt body 486 may be attached to the first notch 478. The bolt body 486 may be attached to the first notch 478 via a threaded connection. The bolt body 486 may also be attached to the bolt head 431 via a threaded connection. A user may secure the cover 402 to the extension plate 426 through fastening the mounting structure 430. In a non-limiting example, a user may fasten the cover 402 to the extension plate 426 by turning the bolt head 431 and causing the bolt body 486 to attach to the first notch 478 via a threaded connection. In some cases, the one or more threaded connections may be provided as anti-vibration mounting structures in order to prevent self-loosening and cater for quick and safe installation. In various implementations, it is to be appreciated that the embodiments of the present inventor afford superior aesthetics by utilizing hidden washers for screws and/or bolts; the hidden washers may be embedded in one or more layers (e.g., the third layer). In various embodiments, the embedded washers may be tamperproof or anti-vibration.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A tonneau cover system, comprising:
a cover configured to cover a bed of a truck, the cover being configured as foldable;
a first side rail configured to be coupled to a side wall of the bed of the truck;
a first connection plate extending from the first side rail;
a second connection plate be configured to slidably engage with the first connection plate; and
an extension plate coupled to the second connection plate, the extension plate being configured to securely attach to the cover through a mounting feature;
wherein the second connection plate and the extension plate are further configured to distribute a force from the cover to the first side rail when the cover is in a closed position.

2. The tonneau cover system of claim 1, wherein the first connection plate comprises a first recess located on a bottom surface of the first connection plate, the first recess is configured to removably engage with the second connection plate such that the first connection plate can removably engage with the second connection plate.

3. The tonneau cover system of claim 2, wherein the second connection plate comprises a first protrusion mirroring the first recess of the first connection plate, the first protrusion is configured to slidably engage with the first recess.

4. The tonneau cover system of claim 3, wherein the first protrusion of the second connection plate is π-shaped.

5. The tonneau cover system of claim 3, wherein a bottom portion of the second connection plate is configured to bear a weight of the first connection plate when the first protrusion engages with the first recess.

6. The tonneau cover system of claim 1, wherein the extension plate extends from the second connection plate.

7. The tonneau cover system of claim 1, wherein the extension plate extends partway along the first side rail and is located toward a front end of the bed of the truck.

8. The tonneau cover system of claim 1, further comprising a connector being configured as positionable between the cover and the first connection plate, the connector being configured to detachably attach to the cover, the connector extending along a total length of the cover.

9. The tonneau cover system of claim 8, wherein the connector comprises a first prong and a second prong configured to engage with the first connection plate and the second connection plate, respectively.

10. The tonneau cover system of claim 9, wherein the first connection plate further comprises a second recess configured to removably engage with the first prong of the connector, the second connection plate further comprises a third recess configured to removably engage with the second prong of the connector.

11. The tonneau cover system of claim 1, further comprising a sealing strip configured to seal down onto a top of the first side rail when the cover is in a closed position.

12. The tonneau cover system of claim 11, wherein the sealing strip comprises an attachment feature configured to removably engage the sealing strip with the cover.

13. A tonneau cover system, comprising:
a first side rail configured to be coupled to a side wall of a truck bed;
a second side rail located toward a front end of the truck bed and coupled to the side wall of the truck bed;
a first connection plate extending from the first side rail;
a second connection plate be configured to slidably engage with the first connection plate;
a third connection plate attached to the second side rail; and
a drainage structure comprising a drainage hole and a drainage pipe extending therethrough, the drainage hole being positioned on the third connection plate.

14. The tonneau cover system of claim 13, wherein the first connection plate comprises a top surface and a side surface, the top surface and the side surface of the first connection plate are configured to form a drainage channel toward the drainage hole.

15. The tonneau cover system of claim 14, wherein the top surface of the first connection plate is configured as a ramp surface.

16. The tonneau cover system of claim 13, wherein the drainage pipe is configured to removably couple to the drainage hole.

17. A tonneau cover system, comprising:
a cover configured to cover a truck bed;
a first side rail configured to be coupled to a side wall of the truck bed;
a first connection plate extending from the first side rail;
a second connection plate configured to slidably engage with the first connection plate;
an extension plate coupled to the second connection plate, the extension plate being configured to securely attach to the cover through a mounting feature; and
a clamp configured to attach the second connection plate to the side wall of the truck bed.

18. The tonneau cover system of claim 17, wherein:
the clamp comprises a first clamp frame and a second clamp frame;
the first clamp frame and the second clamp frame are coupled together using a fastener.

19. The tonneau cover system of claim 18, wherein the first clamp frame and the second clamp frame are configured as C-shaped.

20. The tonneau cover system of claim 17, further comprising:
a foam spacer positionable between the cover and the extension plate, the foam spacing being configured for impact absorption.

* * * * *